United States Patent
Tam

(10) Patent No.: US 11,318,597 B2
(45) Date of Patent: May 3, 2022

(54) MODULAR HANDHELD ELECTRIC TOOL SYSTEM

(71) Applicant: Cheuk Hung Tam, Kowloon Bay Kln (HK)

(72) Inventor: Cheuk Hung Tam, Kowloon Bay Kln (HK)

(73) Assignee: C ENTERPRISE HK LIMITED, Hong Kong (HK)

( * ) Notice: Subject to any disclaimer, the term of this patent is extended or adjusted under 35 U.S.C. 154(b) by 210 days.

(21) Appl. No.: 16/621,778

(22) PCT Filed: Jun. 14, 2018

(86) PCT No.: PCT/CN2018/091303
§ 371 (c)(1),
(2) Date: Dec. 12, 2019

(87) PCT Pub. No.: WO2018/228484
PCT Pub. Date: Dec. 20, 2018

(65) Prior Publication Data
US 2020/0147778 A1    May 14, 2020

(30) Foreign Application Priority Data
Jun. 14, 2017    (HK) .................................. 17105913.4

(51) Int. Cl.
*B25F 5/02*    (2006.01)
*B23D 49/16*    (2006.01)
*B25F 3/00*    (2006.01)

(52) U.S. Cl.
CPC .............. *B25F 5/02* (2013.01); *B23D 49/162* (2013.01); *B25F 3/00* (2013.01)

(58) Field of Classification Search
CPC ............. B25F 5/02; B25F 3/00; B23D 49/162
(Continued)

(56) References Cited

U.S. PATENT DOCUMENTS

| 2013/0058711 A1* | 3/2013 | Van Der Linde | ...... F16M 13/02 403/349 |
| 2015/0041166 A1* | 2/2015 | Van Der Linde | ........ H01R 4/64 173/29 |
| 2015/0078811 A1* | 3/2015 | Van Der Linde | ......... B25F 5/02 403/322.1 |

FOREIGN PATENT DOCUMENTS

CN    WO 2008/041207 A2    4/2008
CN         102205533 A      10/2011
(Continued)

OTHER PUBLICATIONS

International Search Report dated Aug. 31, 2018 in corresponding PCT International Application No. PCT/CN2018/091303.
(Continued)

*Primary Examiner* — Omar Flores Sanchez
(74) *Attorney, Agent, or Firm* — Ostrolenk Faber LLP

(57) ABSTRACT

A modular handheld electric tool system comprises a handle, a motor module and a tool head. The handle includes a handle housing with an elongate portion configured to provide a grip, a handle electrical coupling on the handle housing, a circuit including a tool switch in the handle housing, the tool switch connected between a power supply and the handle electrical coupling. The motor module including a motor casing that holds an electric motor, a motor electrical coupling on the motor casing that is complementary to the handle electrical coupling and electrically connected to the electric motor, and a rotary output mounted to the motor casing and driven by the electric motor. At least one tool head is releasably attachable both to the motor module via a tool-less tool-head-to-motor mechanical coupling, and to the handle via a tool-less tool-head-to-handle mechanical coupling, the tool head including an accessory and tool body wherein, to supply torque to the accessory (Continued)

from the electric motor, a rotary input mounted to the tool body engages the rotary output of the motor module.

23 Claims, 7 Drawing Sheets

(58) Field of Classification Search
USPC .......................................................... 30/166.3
See application file for complete search history.

(56) References Cited

FOREIGN PATENT DOCUMENTS

| CN | 102328307 A | 1/2012 | |
|---|---|---|---|
| EP | 0 235 735 A1 | 9/1987 | |
| WO | WO 89/04080 A1 | 5/1989 | |
| WO | WO 2011/103636 A1 | 9/2011 | |
| WO | WO-2018036817 A1 * | 3/2018 | ........... B23K 3/0323 |

OTHER PUBLICATIONS

Written Opinion dated Aug. 31, 2018 in corresponding PCT International Application No. PCT/CN2018/091303.

* cited by examiner

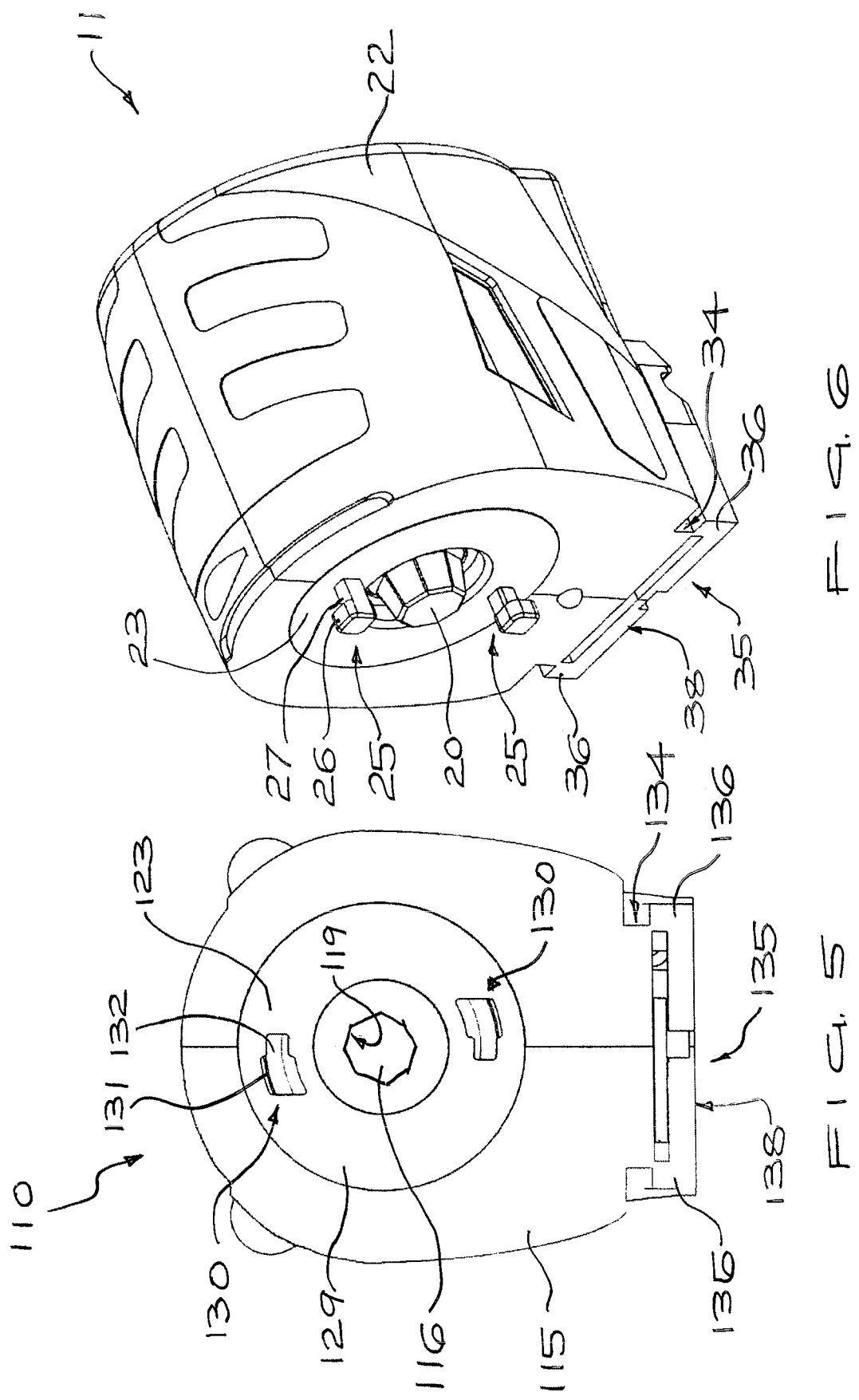

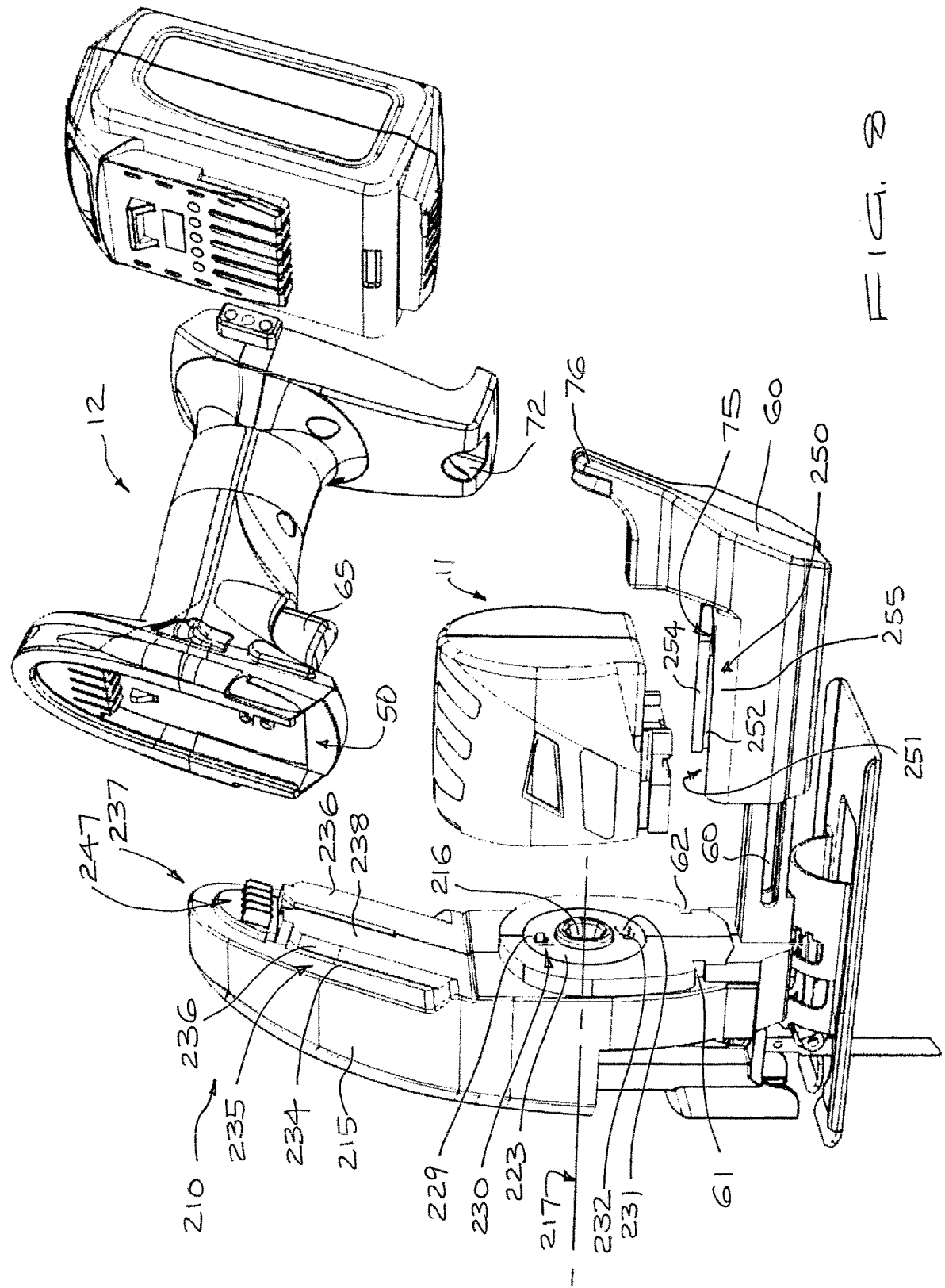

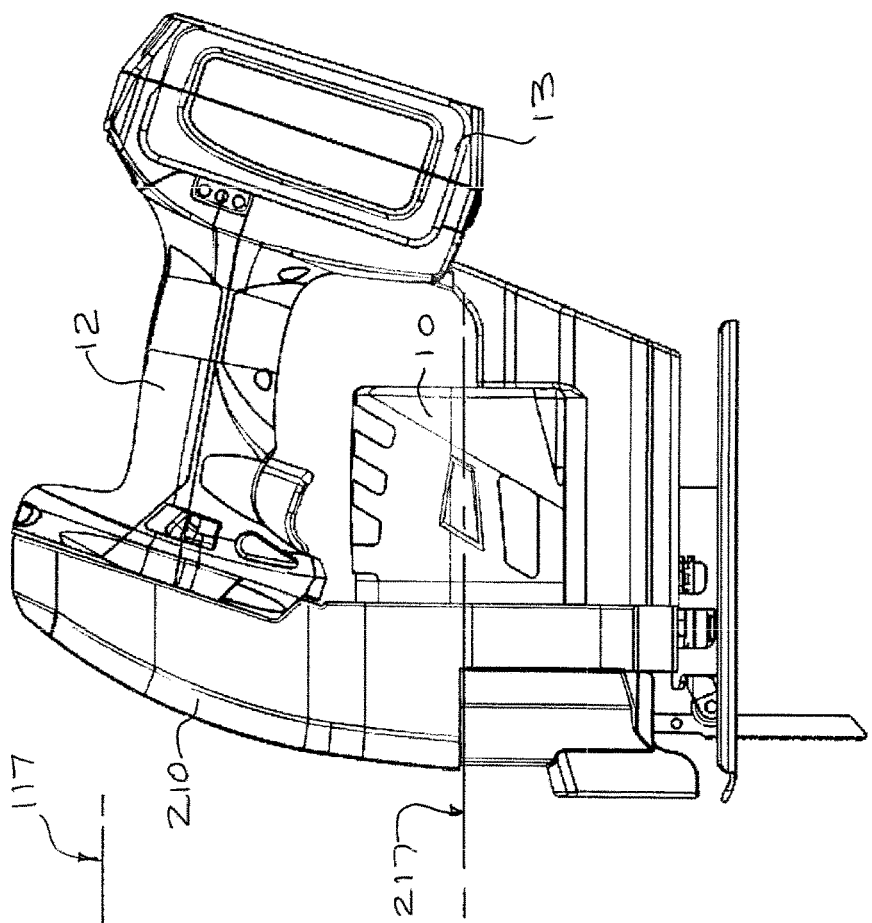
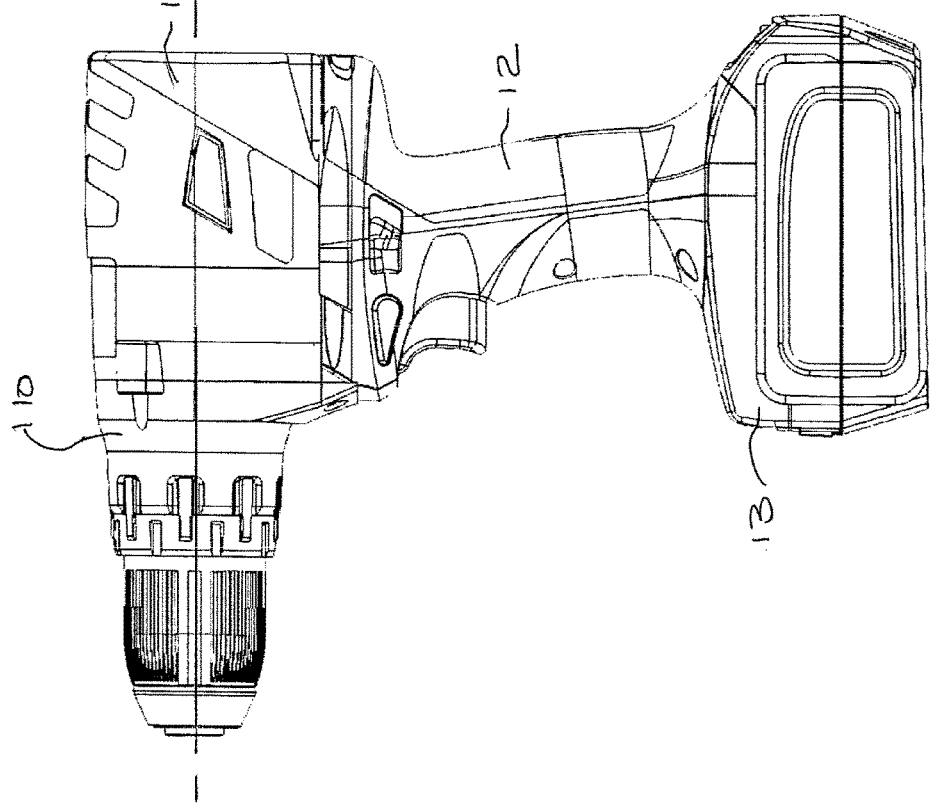

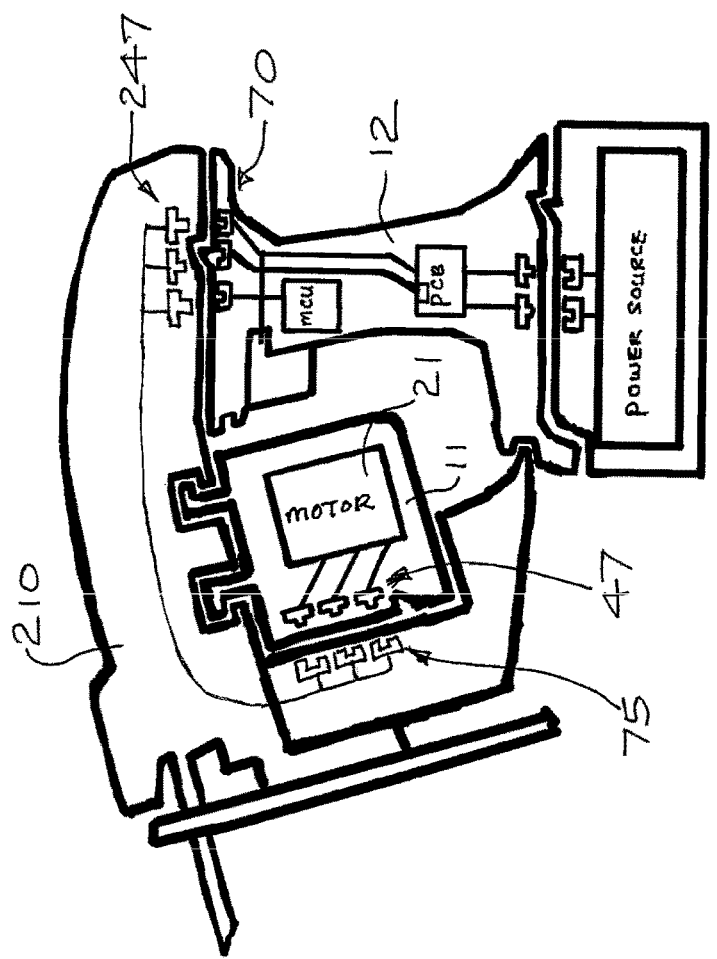
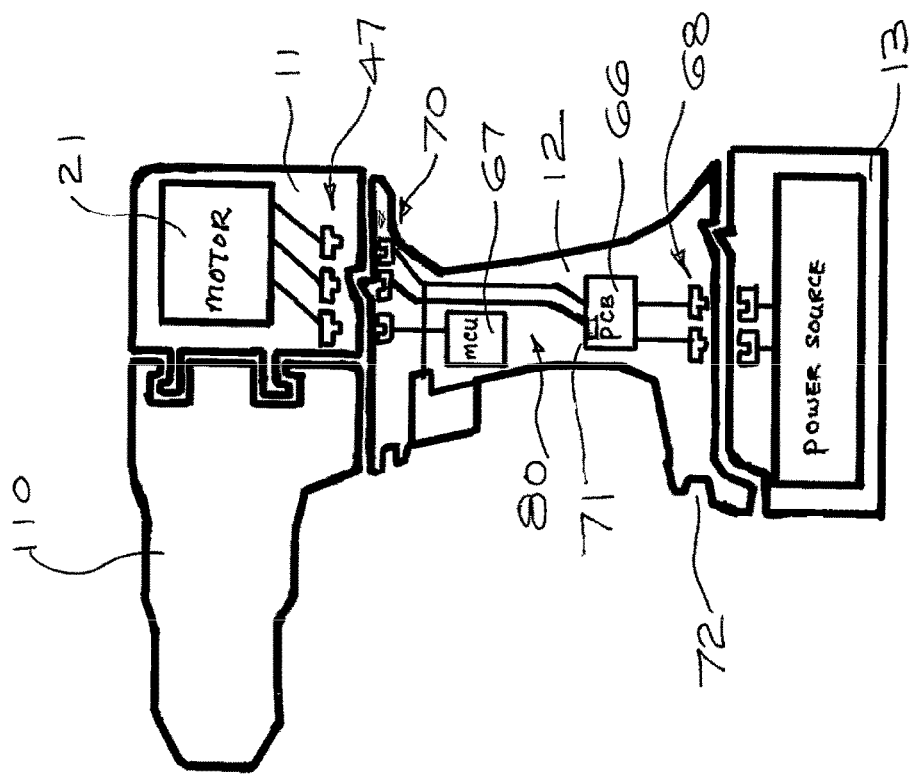
FIG. 12
FIG. 11

MODULAR HANDHELD ELECTRIC TOOL SYSTEM

CROSS-REFERENCE TO RELATED APPLICATIONS

The present application is a 35 U.S.C. §§ 371 national phase conversion of PCT/CN2018/091303, filed Jun. 14, 2018, which claims priority to Hong Kong Patent Application No. 17105913.4, filed Jun. 14, 2017, the contents of which are incorporated herein by reference. The PCT International Application was published in the English language.

TECHNICAL FIELD

The present invention relates to handheld electric tools that are assembled from modular components for performing different functions.

BACKGROUND OF THE INVENTION

The Applicant's International Application, published as WO2008041207A2, describes a modular tool system comprising a universal handle module which can be tool-lessly connected to either a saw module or to a reversible driver module. Controls on the handle module provide a safety interlock switch for operation of the saw module which can also control the direction that the driver turns. Such a system is particularly suited to occasional users of handheld electric tools or appliances, who tend to greatly value certain features in these products that are perhaps less important to those whose tools will see a higher level of day-to-day usage. Among these, important features include versatility and cost-effectiveness and, as the tools may spend considerable time unused, the ability to store the tool is a small space is also advantageous. These factors have driven the adoption of modular tool systems like that identified above which, by providing components able to be assembled into both a driver and a saw, for instance, offer the required versatility while, by reducing the number of components compared to conventional tools, they can be made at a lower cost than separate conventional power tools. The ability to readily break them down into modules without the need for hand tools allows them to be conveniently stored. Although this prior art product performs satisfactorily, it will be understood that there remains a need for a modular tool system that can provide improvements in these areas of versatility, cost-effectiveness and storage ability. It is an object of the present invention to address this need or, more generally, to provide an improved modular handheld electric tool system.

DISCLOSURE OF THE INVENTION

According to a first aspect of the present invention, there is provided a modular handheld electric tool system comprising:

a handle including a handle housing with an elongate portion configured to provide a grip, a handle electrical coupling on the handle housing, a circuit including a tool switch in the handle housing, the tool switch connected between a power supply and the handle electrical coupling;

a motor module including a motor casing that holds an electric motor, a motor electrical coupling on the motor casing that is complementary to the handle electrical coupling and electrically connected to the electric motor, and a rotary output mounted to the motor casing and driven by the electric motor; and at least one tool head releasably attachable both to the motor module via a tool-less tool-head-to-motor mechanical coupling, and to the handle via a tool-less tool-head-to-handle mechanical coupling, the tool head including an accessory and tool body wherein, to supply torque to the accessory from the electric motor, a rotary input mounted to the tool body engages the rotary output of the motor module.

Preferably, the power supply is a battery pack that may be integral with, fixed to, or at least partially held within, the handle housing. Alternatively or additionally, the power supply may comprise a cord for supplying mains power.

Preferably, the handle housing has longitudinally opposing ends, a connector of the tool-head-to-handle mechanical coupling is disposed on one end, and the battery pack is demountably arranged on the other end.

Preferably each tool head has an axis about which the rotary input turns, the tool-head-to-motor mechanical coupling is a push-and-turn coupling, wherein complementary couplers, disposed on the motor casing and tool body, are mutually connected by relative movement along the axis between the tool head and motor module, followed by relative rotation about the axis between the tool head and motor module. The push-and-turn coupling may comprise a bayonet coupling or a screw coupling.

Preferably the tool-head-to-handle mechanical coupling is a sliding coupling comprising complementary male and female connectors on the tool head and handle, and wherein the handle cooperates with the tool head to prevent release of the push-and-turn coupling. The sliding coupling preferably prevents relative rotation between the tool head and the motor module about the axis.

Preferably the push-and-turn coupling comprises a bayonet coupling, an interface between each tool body and motor casing comprises respective abutment faces generally transverse to the axis, and one of the couplers of the bayonet coupling comprises at least one projection axially extending from one abutment face, an enlarged head on a distal end of the projection adjacent a shaft portion, the other of the couplers of the bayonet coupling comprising at least one aperture in or adjacent the other abutment face for receiving the projection, the aperture having a stepped form comprising a broad section and an adjacent narrow section, such that the enlarged head can be passed axially through the broad section by the relative movement along the axis, and the relative rotation about the axis places the shaft portion in the narrow section, in which position the enlarged head restricts relative axial movement between the tool head and motor module.

Optionally, the enlarged head and/or the part cooperating therewith, may have ramp surfaces that cooperate to draw the tool body and motor casing together during the relative rotation about the axis.

Preferably the at least one projection and at least one aperture comprise two of the projections and two of the respective apertures as described above, which are disposed substantially equidistant from the axis and diametrically opposite one another.

The at least one tool head may comprise a first tool head for performing a first function.

Preferably, in the first tool head, the male and female connectors are slidably interengaged by relative movement substantially parallel to the axis of the first tool head.

Preferably, one of the male and female connectors is disposed on the handle housing, and the other of the male and female connectors comprises a first part disposed on the tool body of the first tool and a second part disposed on the motor casing, so that, after making the push-and-turn coupling, the first and second parts are angularly aligned and then both parts are slidingly interengaged with the connector on the handle housing to thereby restrict relative rotation between the first tool head and the motor module about the axis to prevent release of the push-and-turn coupling.

Preferably, in the first tool head, the motor electrical coupling and the handle electrical coupling are engaged by the same relative sliding movement that interengages the first and second parts with the connector on the handle housing.

The at least one tool head may comprise a second tool head for performing a second function.

Preferably the second tool head comprises: a jaw mounted to reciprocate relative to the tool head, the jaw comprising a jaw section complementary to the connector of the second part whereby, after making the push-and-turn coupling, engaging the jaw with the second part restricts relative rotation between the tool head and the motor module about the axis.

Preferably the jaw is mounted to reciprocate relative to the tool head between extended and retracted positions, and retracting the jaw from its extended position engages the jaw with the second part.

Preferably the handle engages the jaw in its retracted position to prevent movement of the jaw to its extended position and thereby prevent release of the push-and-turn coupling.

Preferably, in the second tool head the jaw is mounted to reciprocate substantially parallel to the axis.

Preferably the second tool head further comprises a jaw electrical coupling mounted on the jaw to engage the motor electrical coupling.

Preferably in the first tool head the accessory comprises a chuck. In the first tool head, a gear transmission in the tool body may transmit torque from the rotary input to the chuck. The chuck can thus selectively secure rotary cutting tools, drive bits, or the like, for performing different operations.

Preferably in the second tool head the accessory comprises a saw. In the second tool head, the saw may comprise a holder for holding a saw blade and a reciprocating drive mechanism may connect the rotary input to the blade holder and convert rotation to reciprocating movement. Alternatively, the saw may be of the rotary type.

Preferably the system comprises both the first and second tool heads and, optionally, further comprises a third tool head.

Alternatively to the chuck or saw, a number of different motor-driven accessories may be used, as for cutting, sanding, grinding, polishing, vacuuming, spraying etc. For instance, the first, second and third tool heads may be selected from:
 a) a tool head adapted for sanding that comprises an accessory in the form of an orbital sanding pad that is driven from the rotary input;
 b) a tool head adapted for vacuum cleaning that comprises a nozzle for drawing in dirty air, a separator for separating dirt from the air, and a container for receiving the dirt and an accessory in the form of a fan driven from the rotary input; and
 c) a tool head adapted for liquid spraying that comprises an accessory in the form of a pump driven from the rotary input, a spray nozzle and a container for holding a liquid product.

Preferably the female connector comprises a recess that is axially elongated, having transversely opposing edges and bounded between lips projecting inwardly from each of the edges and a base surface of the recess. Preferably one longitudinal end of the recess is open and an opposing end is closed.

Preferably the male connector comprises a protrusion from a neck, longitudinally extending ribs are disposed on transversely opposing sides of the protrusion and are received inside the lips, as the neck passes between the lips.

Preferably a latch restrains relative sliding movement between the male and female connectors.

Preferably the female connector is disposed on the handle housing, the jaw section has a like form to the female connector, and both the first part and the second part are male connector parts of like form.

By providing a separate motor module releasably attachable to the tool head in the manner of the invention, multiple tool heads for performing different functions can be provided without the need for respective motors and, as the motor cost is a significant component of the overall system cost, a worthwhile cost saving is achieved. This invention provides an overall simple design which minimizes manufacturing costs and maximizes performance. Repair and maintenance of the power tool is simplified and manufacturers can offer models with different power outputs by simply by offering different motor modules.

BRIEF DESCRIPTION OF THE DRAWINGS

Preferred forms of the present invention will now be described by way of example with reference to the accompanying drawings, wherein:

FIG. 5 is an end view of the power head of FIG. 1;

FIGS. 6 and 7 are perspective views of the motor module of FIG. 1;

FIG. 8 is a perspective view of the modules of FIG. 2 separated from one another;

FIG. 9 is a side view of the modules of FIG. 1 connected to one another;

FIG. 10 is a side view of the modules of FIG. 1 connected to one another; and FIGS. 11 and 12 are schematic diagrams of the electrical circuits of the assemblies of FIGS. 1 and 2 respectively.

DESCRIPTION OF THE PREFERRED EMBODIMENTS

Figure 2:
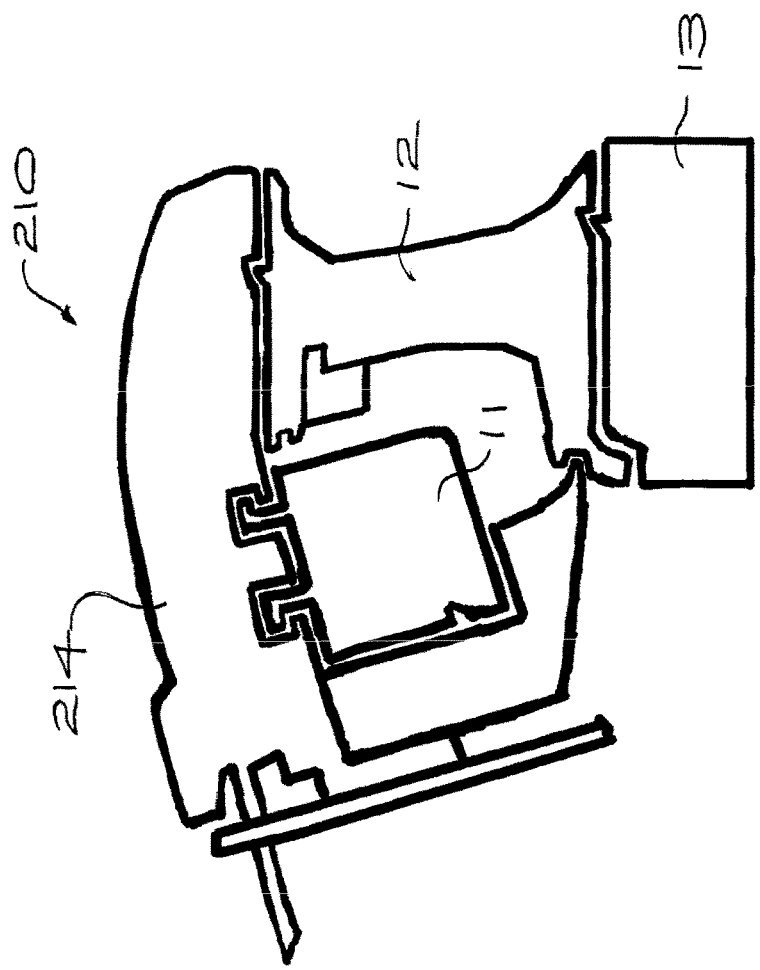
FIG. 2 is a schematic side view of modules of an embodiment of the present invention assembled to form a jigsaw.
Figure 1:
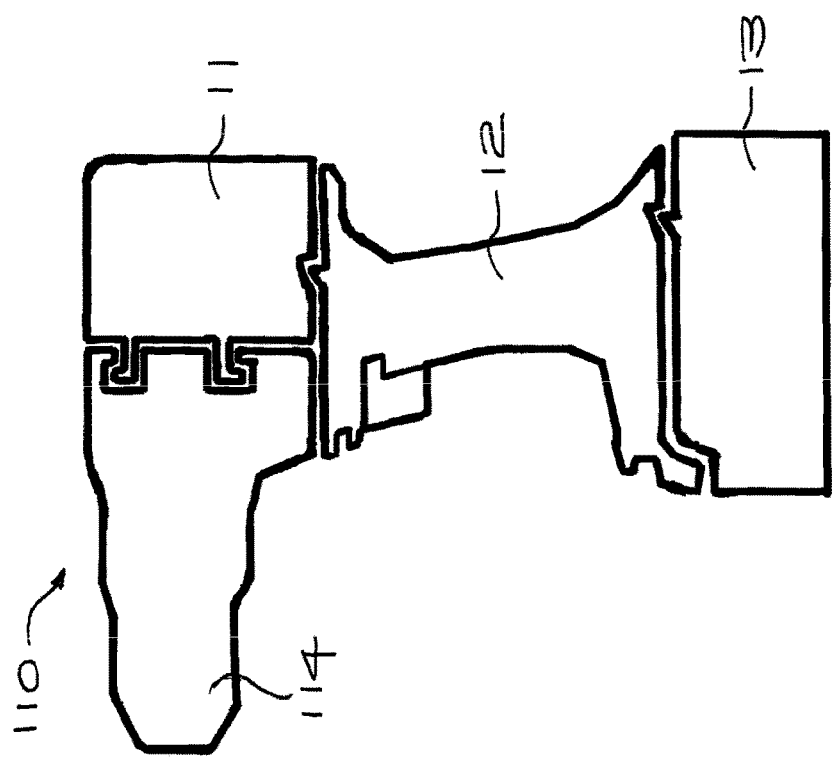
FIG. 1 is a schematic side view of modules of an embodiment of the present invention assembled to form a driver or drill.

A modular handheld electric tool system of an embodiment of the invention is schematically shown in FIGS. 1 and 2, and comprises modules including a handle 12, a motor module 11, a first tool head 110 (FIG. 1) and a second tool head 210 (FIG. 2), and may also comprise a battery pack 13. A system of the invention may comprise five modules: including one handle 12, one motor module 11, one battery pack 13, one first tool head 110 and one second tool head 210 from which, for example, both the power driver of FIG.

1, as well as the jigsaw of FIG. 2, can be assembled. The first tool head 110 may comprise an accessory in the form of a chuck 114, and FIG. 1 shows the power driver (or drill) assembled by connection of the modules 110, 11, 12, 13, with the battery pack 13 connected at one end of the handle 12, the first tool head 110 connected at another end of the handle 12, and the motor module 11 connected to the first tool head 110. The second tool head 210 may comprise an accessory in the form of a reciprocating saw 214, and FIG. 2 shows the jigsaw assembled by connection of the modules 210, 11, 12, 13, with the battery pack 13 connected at one end of the handle 12, the second tool head 210 connected at another end, and the motor module 11 connected to the second tool head 210. Two different handheld electric tools can thus be assembled from the modules 110, 210, 11, 12, 13, and simply by providing the system with additional tool heads (not shown) additional tools can be assembled, making the system very versatile. It is also a cost effective system, as the replication of costly parts, particularly motors, is avoided. Moreover, reducing the size of the modules, makes them able to be more readily stored when not in use. Further advantages are achieved by the manner in which the connections between the modules are made for ready assembly in the different configurations without tools, while providing the requisite strength and rigidity, and this is described in more detail below.

Referring to FIGS. 3 to 6, the chuck 114 is mounted at one end of a tool body 115 of the first tool head 110. A rotary input 116 is mounted to the tool body 115 adjacent a substantially planar transverse abutment face 123 at the other end of the tool body 115. The rotary input 116 rotates about an axis 117, and may include a recess with multiple facets 119. A gear transmission 18 in the tool body 115 is connected to the rotary input 116 to transmit drive torque to the chuck 114.

The motor module 11 has a rotary output 20 mounted to the motor casing 22. The rotary output 20 is fixed on one end of an output shaft (not shown) of a reversible electric motor 21 held in the motor casing 22. The rotary output 20 is complementary to the rotary input 116, in which it is adapted to be received, and may comprise a nub projecting axially from a substantially planar transverse abutment face 23 at one end of the motor casing 22, the nub being tapered to narrow in the axial direction toward its free outer end.

A push-and-turn tool-head-to-motor mechanical coupling may be in the form of a bayonet coupling, for tool-less connection of the motor module 11 to the first tool head 110 and to the second tool head 212. Projecting axially from the abutment face 23, one of the couplers on the motor module 11 may comprise a pair of projections 25, each with an enlarged head 26 on its distal end, adjacent a shaft portion 27. The projections 25 may be disposed substantially equidistant from the axis and diametrically opposite one another. The other of the couplers of the bayonet coupling on the tool heads 110, 210 are of the same construction and form may comprise a ring 129, 229 on which the abutment face 123, 223 is formed, each ring 129, 229 having a pair of apertures 130, 230 for receiving the projections 25, each aperture 130, 230 having a stepped form comprising a broad section 131, 231 and an adjacent narrow section 132, 232. The second tool head 210 had a rotary input 216 like the rotary input 116. The rotary input 216 is mounted to the tool body 215 adjacent a substantially planar transverse abutment face 223 and rotates about an axis 217, and may include a recess with multiple facets 219.

In use, the motor module 11 and tool head 110 (or 210) are brought together with respective abutment faces 23 and 123 (or 223) providing an interface, the motor module 11 is aligned with the axis 117 (or 217) and the two modules are in a first angular position in which the enlarged heads 26 are axially aligned with the broad sections 131 (or 231), such that the enlarged heads 26 can be passed axially through the broad sections 131 (or 231) by the relative movement along the axis 117 (or 217). The tapering of the rotary output 20 ensures it is readily engaged with the facets 19 by this same relative axial movement. The thickness of the ring 129, 229 (in the axial direction) around the narrow sections 132, 232 is substantially the same as the axial dimension between the head 26 and abutment faces 23, so that the relative rotation about the axis 117, 217 to a second angular position places the shaft portions 27 in the narrow sections 32, in which position the enlarged heads 26 restricts relative axial movement tending to separate the tool head 110 and motor module 11.

Figure 7:
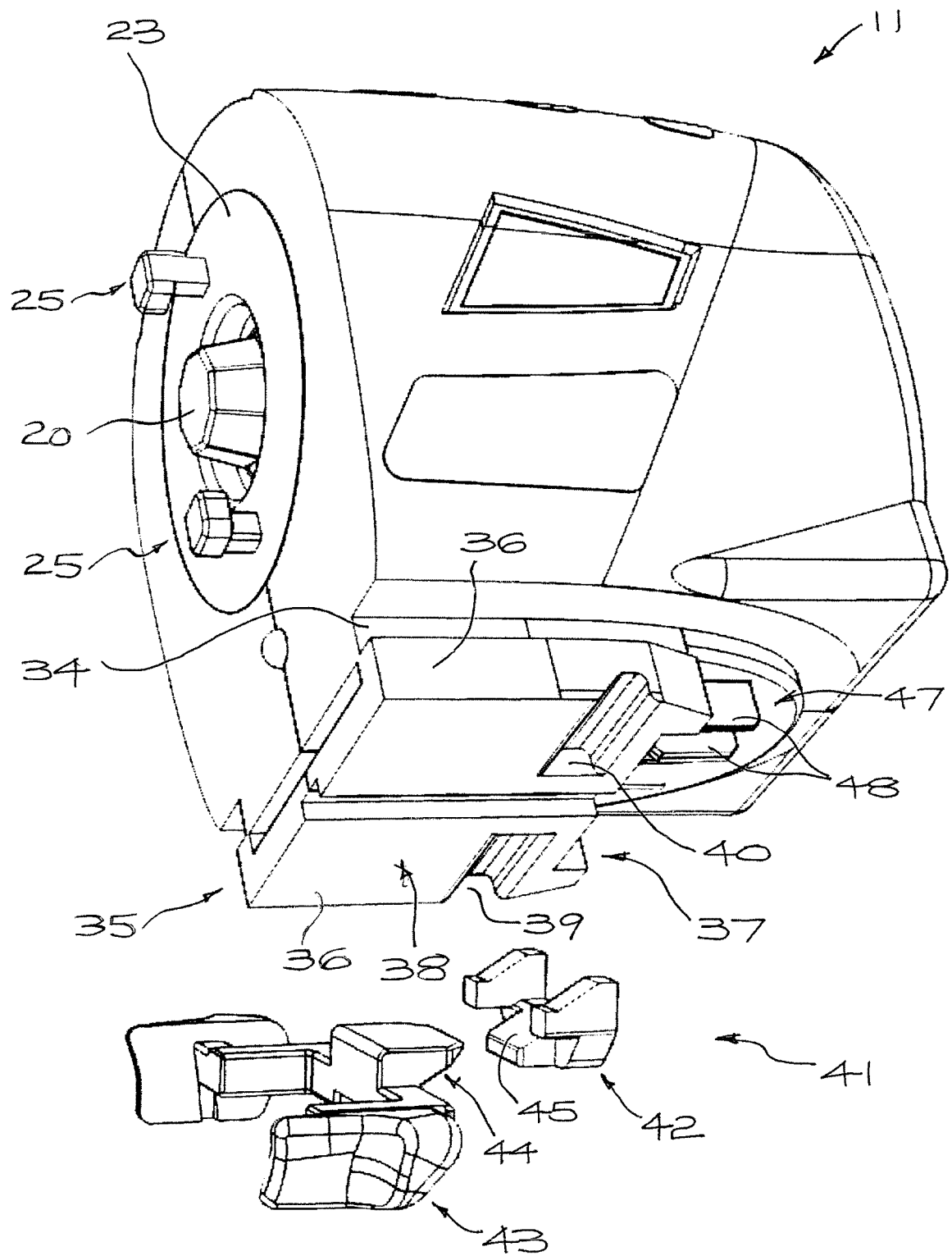

The motor module 11 may further comprise a male connector 35, best seen in FIG. 7, for making a sliding coupling with a complementary female connector 50 on the handle 12 (and female connector 250 on the tool head 210) in a manner that serves to prevent rotation sufficient to release the bayonet coupling (i.e. relative rotation between the motor module 11 and tool head 110, 210 from the second angular position to the first angular position). The male connector 35 on the motor module 11 may comprise a protrusion formed on the motor casing 22, protruding transversely from a neck 34 and having a generally rectangular prismatic form that extends axially rearward from the abutment face 23 to a second end 37 of the male connector 35. Longitudinally extending ribs 36 are disposed on both transversely opposing sides of the protrusion adjacent the neck 34. An outer face 38 of the projection may be planar and longitudinally extending, with recesses 39, 40 formed therein.

FIG. 7 also shows some components of a latch assembly 41 of the handle 12 that restrains relative sliding movement between the male and female connectors when the first tool head 110 is mounted. The latch assembly 41 is mounted to the handle 12 and includes latch 42, and actuator 43. The latch 42 is mounted to slide transversely between a latched position, in which it projects into the recesses 39, 40 to restrain relative longitudinal sliding movement, and a retracted position allowing free longitudinal sliding movement. The actuator 43 is mounted to slide longitudinally and has a ramp 44 that cooperates with a ramp 45 on the latch 42 to move the latch 42 to its retracted position. A spring (not shown) acting on the latch 42 urges both the latch 42 and actuator 43 to their respective latched positions. A motor electrical coupling 47 that is electrically connected for supplying power to the motor 21 is fixed to the motor casing 22 adjacent the second end 37 of the male connector 35, and may comprise an array of planar electrical contacts 48 aligned longitudinally and spaced apart transversely.

Figures 3, 4:
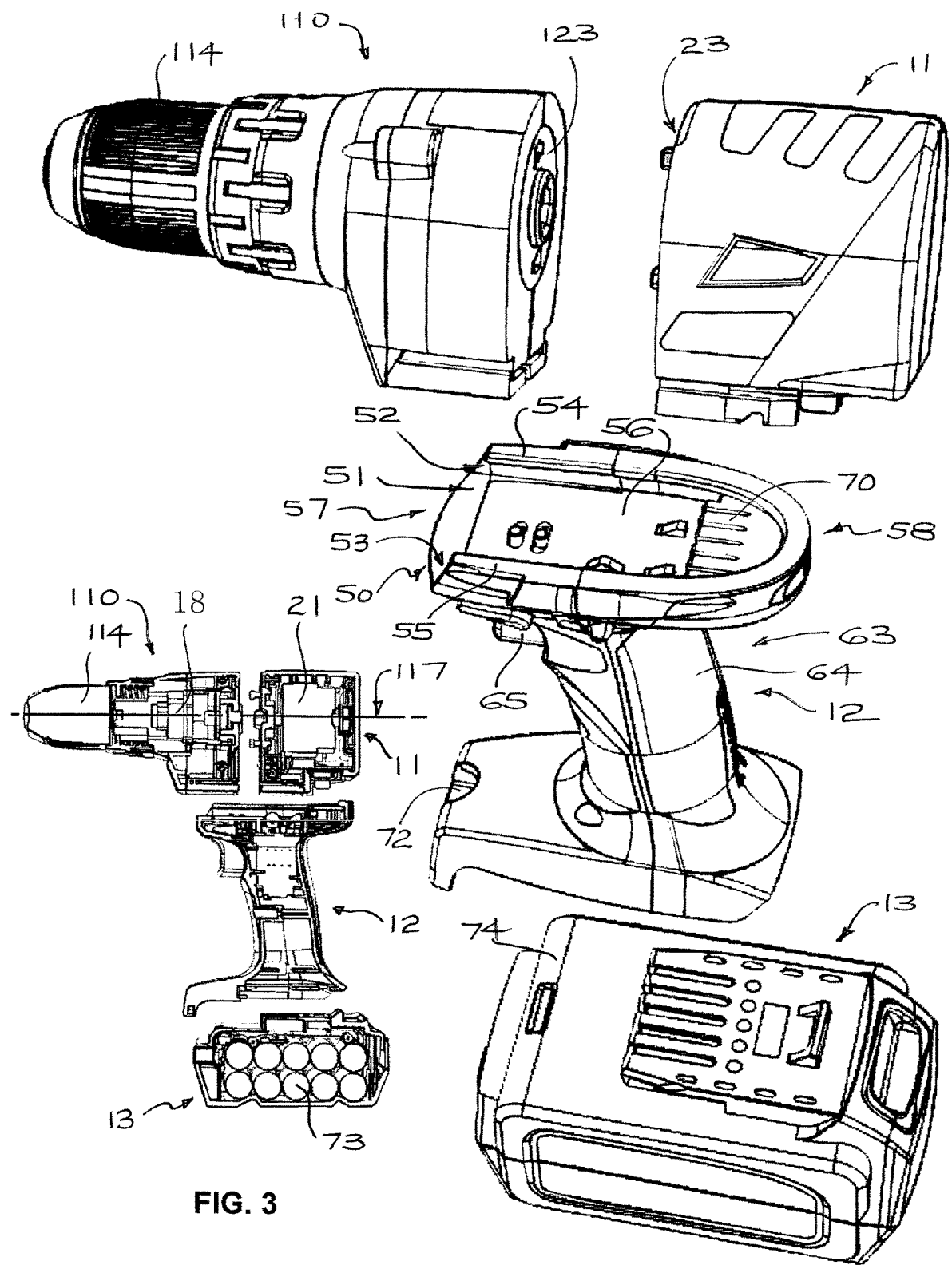
FIG. 3 is a cross-sectional view of the modules of FIG. 1 separated from one another.
FIG. 4 is a perspective view of the modules of FIG. 1 separated from one another.

Having like form and alignment to the male connector 35, a male connector 135 may be formed on the tool body 115 of the first tool head 110, as best seen in FIGS. 4 and 5. The male connector 135 is formed as a protrusion on the tool body 115, protruding transversely from a neck 134 and having a generally rectangular prismatic form of the same transverse cross section as the male connector 35, it extends axially forward from the abutment face 123. Its longitudinally extending ribs 136 are disposed on transversely opposing sides of the protrusion adjacent the neck 134 and its outer face 138 may be planar and longitudinally extending. With the first tool head 110 and motor module 11 connected by the bayonet coupling the motor module 11 and tool head 110 are at their second angular position, in which the male connectors 35 and 135 are aligned i.e. the ribs 36 and 136 are coaxial.

Also having like form to the male connector 35, a male connector 235 may be formed on the tool body 215 of the second tool head 210, as best seen in FIG. 8. The male connector 235 is formed as a protrusion on the tool body 215, protruding from a neck 234 and having a generally rectangular prismatic form of the same transverse cross section as the male connector 35. Its two longitudinally extending ribs 236 are disposed on transversely opposing sides of the protrusion adjacent the neck 234 and its outer face 238 may be planar and longitudinally extending. A first tool head electrical coupling 247 that is electrically connected for supplying power to the motor 21 is fixed to the tool body 215 adjacent the second end 237 of the male connector 235, and is of like form and dimensions to the motor electrical coupling 47, comprising an array of planar electrical contacts aligned longitudinally and spaced apart transversely.

The handle 12 further comprises a handle housing 63 with an elongate central portion configured to provide a grip 64. A female connector 50 may be formed in an upper end of the handle housing 63, while the battery pack 13 may be fixed at the opposing lower end. The female connector 50 has a form complementary to that of male connector 135 and makes the tool-head-to-handle mechanical coupling, while female connector 250 with a like cross-sectional form and dimensions is formed on the second tool head 210. The female connector 50 comprises a recess 51 that is axially elongated, having transversely opposing edges 52, 53 and is bounded between a base surface 56 of the recess 51 and lips 54, 55 projecting inwardly from each of the edges 52, 53. One longitudinal end 57 of the recess 51 is open and an opposing end 58 is closed. The female connector 250 comprises a recess 251 that is axially elongated, having transversely opposing edges 252, 253 and is bounded between lips 254, 255 projecting inwardly from each of the edges 252, 253 and from a base surface 256 of the recess 251. One longitudinal end 257 of the recess 251 is open and an opposing end 258 is closed.

The female connector 50 on the handle 12 thus has like form to female connector on the handle of the system described in the above-mentioned publication WO2008041207A2, which is incorporated by reference herein in its entirety. This common form provides backward compatibility, allowing this old handle to be used in a system of the invention. This publication also describes other features present on the old handle and old tool heads (as to provide a safety interlock switch for the operation of the saw and direction control for the driver turns) that are replicated for the same purposes in the invention, and are not described in detail herein.

A cavity 72 may be formed in the lower end of the handle housing 63, its mouth opening in a forward direction. At the upper end of the grip 64 below the female connector 50 is a trigger 65 that protrudes from the handle housing 63 in the forward direction and is used to control the tool head 110, 210. Within the handle housing 63 the control circuit 80 for the system may comprise a printed circuit board 66 carrying a tool switch 71 actuated by the trigger 65 and a microcontroller 67. Power is provided to the control circuit 80 via a coupling 68 at the lower end that engages a coupling 69 of the battery pack 13 and power and control signals are provided to tool head 110, 210 via the handle electrical coupling 70. The handle electrical coupling 70 is complementary to both the motor electrical coupling 47 and the first tool head electrical coupling 247 and is disposed adjacent the closed end 58 of the female connector 50.

Referring to FIG. 8, in the second tool head 210, the saw 214 may comprise a holder for holding a saw blade and a reciprocating drive mechanism may connect the rotary input to the blade holder and convert rotation to reciprocating movement. The second tool head 210 further comprises: a sliding jaw 60 mounted to reciprocate relative to the tool body 215 as by a guide slot 60 substantially parallel to the axis 117. The sliding jaw 60 comprises a female connector 250 complementary to the male connector 35 whereby, after making the push-and-turn coupling, engaging the jaw 60 with the male connector 35 restricts relative rotation between the tool head and the motor module 11 about the axis 117. The jaw 60 also comprises a second tool head electrical coupling 75 complementary to the motor electrical coupling 47 and of like form and dimensions to the handle electrical coupling 70. A projection 76 in the jaw 60 may be located for registration with the cavity 72. Notches 61, 62 in the tool body 215 may be located for registration with the lips 254, 255. The jaw 60 may mounted to reciprocate relative to the tool head 210 between an extended position (shown in FIG. 8) in which the motor module 11 may attached and detached, and a retracted position (shown in FIG. 10) in which the rotation between the motor module 11 and tool head 210 sufficient to release of the push-and-turn coupling is prevented by the sliding engagement of the couplers, and in which ends of the lips 254, 255 are received in the notches 61, 62

The battery pack 13 may comprise a plurality of rechargeable cells 73 held in a housing 74. Male and female couplers (of a like type to the male couplers 35, 135 and female couplers 50, 250) may be formed on the housing 74 and lower end of the handle 12 respectively, and configured for sliding engagement to mechanically connect the battery pack 13 to the handle 12 at the same time as the couplings 68 and 69 are engaged to electrically connect the battery pack 13 to the handle 12.

To make the tool-head-to-handle mechanical coupling with the tool head 110, the tool head 110 and motor module 11 are first connected by the bayonet push-and-turn coupling in the manner described above, such that the motor module 11 and tool head 110 are at their second angular position, in which the male connectors 35 and 135 are aligned. In this manner, both male connectors 35 and 135 are entered through the open end 57 into the recess 51, the outer faces 38, 138 overlying the base surface 56, and the ribs 36, 136 received inside the lips 54, 55, as the neck 34, 134 passes between the lips 54, 55. This relative longitudinal sliding movement continues until the electrical couplings 70 and 47 are engaged, whereupon the latch 42 is urged into the recesses 39, 40. In this position (shown in FIG. 9), the handle 12 cooperates with the tool head 110, preventing the relative rotation between the tool head 110 and motor module 11 that would release of the bayonet coupling.

To then make the tool-head-to-handle mechanical coupling with the tool head 210, the tool head 110 and motor module 11 are first separated from the handle 12, by reversing the above-described steps. The jaw 60 is retracted and the motor module 11 is connected by the bayonet coupling in a like manner to that described above, by axially entering the projections 25 into the apertures 230 in the first angular position, before relative turning about the axis 217 places the shaft portions 27 in the narrow sections 232 and aligns the neck 34 with the notches 61, 62. Next, the jaw 60 is retracted, whereby the male connector 35 is entered through the open end 257 into the recess 251, the outer face 38 overlies the base surface 56, and the ribs 36 are received inside the lips 254, 255, as the neck 34 passes between the lips 254, 255. This relative longitudinal sliding movement continues until the electrical couplings 75 and 47 are engaged. The handle 12 is then fixed to the tool head 210, by mating the male connector 235 and female connector 50, continuing the longitudinal sliding movement until the electrical couplings 70 and 247 are engaged, whereupon the latch 42 is urged into the recesses 39, 40, and the projection 76 in the jaw 60 is received in the cavity 72. In this position (shown in FIG. 10), the handle 12 cooperates with the tool head 210, preventing movement of the jaw 60 toward its extended position that would release of the bayonet coupling.

Aspects of the present invention have been described by way of example only and it should be appreciated that modifications and additions may be made thereto without departing from the scope thereof.

The invention claimed is:

1. A modular handheld electric tool system comprising:
   a handle including a handle housing with an elongate portion configured to provide a grip, a handle electrical coupling on the handle housing, a circuit including a tool switch in the handle housing, the tool switch connected between a power supply and the handle electrical coupling;
   a motor module including a motor casing that holds an electric motor, a motor electrical coupling on the motor casing that is complementary to the handle electrical coupling and electrically connected to the electric motor, and a rotary output mounted to the motor casing and driven by the electric motor; and
   at least one tool head releasably attachable both to the motor module via a tool-less tool-head-to-motor mechanical coupling, and to the handle via a tool-less tool-head-to-handle mechanical coupling, the tool head including an accessory and a tool body wherein, to supply torque to the accessory from the electric motor, a rotary input mounted to the tool body engages the rotary output of the motor module.

2. The modular handheld electric tool system of claim 1 wherein the handle housing has longitudinally opposing ends, a connector of the tool-head-to-handle mechanical coupling is disposed on one end, and the power supply comprises a battery pack demountably arranged on the other end.

3. The modular handheld electric tool system of claim 1 wherein each tool head has an axis about which the rotary input turns, the tool-head-to-motor mechanical coupling is a push-and-turn coupling, wherein complementary couplers, disposed on the motor casing and the tool body, are mutually connected by relative movement along the axis between the tool head and motor module, followed by relative rotation about the axis between the tool head and motor module.

4. The modular handheld electric tool system of claim 3 wherein the tool-head-to-handle mechanical coupling is a sliding coupling comprising complementary male and female connectors on the tool head and handle, and wherein the handle is configured to cooperate with the tool head to prevent release of the push-and-turn coupling.

5. The modular handheld electric tool system of claim 4 wherein the push-and-turn coupling comprises a bayonet coupling, an interface between each tool body and motor casing comprises respective abutment faces generally transverse to the axis, and one of the couplers of the bayonet coupling comprises at least one projection axially extending from one abutment face, an enlarged head on a distal end of the projection adjacent a shaft portion, the other of the couplers of the bayonet coupling comprising at least one aperture in or adjacent the other abutment face for receiving the projection, the aperture having a stepped form comprising a broad section and an adjacent narrow section, such that the enlarged head can be passed axially through the broad section by the relative movement along the axis, and the relative rotation about the axis places the shaft portion in the narrow section, in which position the enlarged head restricts relative axial movement between the tool head and motor module.

6. The modular handheld electric tool system of claim 5 wherein the at least one projection comprises two projections disposed substantially equidistant from the axis and diametrically opposite one another, and two respective apertures.

7. The modular handheld electric tool system of claim 5 wherein the at least one tool head comprises a first tool head configured for performing a first function releasably attachable to the motor module and to the handle.

8. The modular handheld electric tool system of claim 7 wherein, the male and female connectors are slidably interengaged by relative movement substantially parallel to the axis of the first tool head.

9. The modular handheld electric tool system of claim 7 wherein one of the male and female connectors is disposed on the handle housing, and the other of the male and female connectors comprises a first part disposed on the tool body of the first tool and a second part disposed on the motor casing, so that, after making the push-and-turn coupling, the first and second parts are angularly aligned and then both parts are slidingly interengaged with the connector on the handle housing to thereby restrict relative rotation between the first tool head and the motor module about the axis to prevent release of the push-and-turn coupling.

10. The modular handheld electric tool system of claim 7 wherein in the first tool head, the motor electrical coupling and the handle electrical coupling are engaged by the same relative sliding movement that interengages the first and second parts with the connector on the handle housing.

11. The modular handheld electric tool system of claim 7 wherein the at least one tool head comprise a second tool head configured for performing a second function of supplying torque to the accessory from the election motor.

12. The modular handheld electric tool system of claim 11 wherein the second tool head comprises: a jaw mounted to reciprocate relative to the tool head, the jaw comprising a jaw section complementary to the connector of the second part whereby, after making the push-and-turn coupling, engaging the jaw with the second part restricts relative rotation between the tool head and the motor module about the axis.

13. The modular handheld electric tool system of claim 12 wherein the jaw is mounted to reciprocate relative to the tool head between extended and retracted positions, and retracting the jaw from its extended position engages the jaw with the second part.

14. The modular handheld electric tool system of claim 12 wherein the handle engages the jaw in its retracted position to prevent movement of the jaw to its extended position and thereby prevent release of the push-and-turn coupling.

15. The modular handheld electric tool system of claim 12 wherein the second tool head the jaw is mounted to reciprocate substantially parallel to the axis.

16. The modular handheld electric tool system of claim 15 wherein the second tool head further comprises a jaw electrical coupling mounted on the jaw to engage the motor electrical coupling.

17. The modular handheld electric tool system of claim 7 wherein in the first tool head the accessory comprises a chuck.

18. The modular handheld electric tool system of claim 11 wherein in the second tool head the accessory comprises a saw.

19. The modular handheld electric tool system of claim 7 wherein the female connector comprises a recess that is axially elongated, having transversely opposing edges and bounded between lips projecting inwardly from each of the edges and a base surface of the recess.

20. The modular handheld electric tool system of claim 19 wherein one longitudinal end of the recess is open and an opposing end is closed.

21. The modular handheld electric tool system of claim 19 wherein the male connector comprises a protrusion from a neck, longitudinally extending ribs are disposed on transversely opposing sides of the protrusion and are received inside the lips, as the neck passes between the lips.

22. The modular handheld electric tool system of claim 21 wherein a latch restrains relative sliding movement between the male and female connectors.

23. The modular handheld electric tool system of claim 7 wherein the female connector is disposed on the handle housing, the jaw section has a form corresponding to a form of the female connector, so that both the first part and the second part are male connector parts of like form.

\* \* \* \* \*